United States Patent
Reiter et al.

(10) Patent No.: US 6,361,070 B1
(45) Date of Patent: Mar. 26, 2002

(54) METHOD OF OPENING A BURST DISC ON A PRESSURIZED CONTAINER AS WELL AS A COMPRESSED GAS SOURCE FOR ACTIVATING A VEHICLE OCCUPANT RESTRAINT SYSTEM

(75) Inventors: Thomas Reiter, Dachau; Thomas Lauenroth, Elbeu, both of (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 09/441,853

(22) Filed: Nov. 17, 1999

(30) Foreign Application Priority Data

Nov. 17, 1998 (DE) .......................................... 198 53 080

(51) Int. Cl.⁷ .......................... B60R 21/26; F16K 17/14
(52) U.S. Cl. ..................................... 280/737; 137/68.27
(58) Field of Search ................................. 280/736, 737, 280/741; 222/5; 137/68.27, 68.29, 72

(56) References Cited

U.S. PATENT DOCUMENTS

| | | | | |
|---|---|---|---|---|
| 5,230,531 A | * | 7/1993 | Hamilton et al. | 280/737 |
| 5,421,609 A | * | 6/1995 | Moore et al. | 280/737 |
| 5,857,698 A | * | 1/1999 | Fuerst et al. | 280/737 |
| 5,893,584 A | * | 4/1999 | Welz | 280/737 |
| 5,934,308 A | * | 4/1999 | Farwell | 137/68.27 |
| 5,996,605 A | * | 12/1999 | Farwell | 137/68.27 |
| 6,006,938 A | * | 12/1999 | Mozley et al. | 137/68.27 |
| 6,010,152 A | * | 1/2000 | Swann et al. | 280/736 |
| 6,062,599 A | * | 5/2000 | Forbes et al. | 280/737 |
| 6,065,773 A | * | 5/2000 | Klinger et al. | 280/736 |
| 6,161,481 A | * | 12/2000 | Shirk et al. | 280/737 |
| 6,178,983 B1 | * | 1/2001 | Culliinane et al. | 137/68.27 |
| 6,192,914 B1 | * | 2/2001 | Farwell | 137/68.27 |

FOREIGN PATENT DOCUMENTS

| | | |
|---|---|---|
| DE | 2118816 | 11/1972 |
| DE | 19513242 | 10/1996 |
| DE | 19524094 | 1/1997 |
| DE | 19612152 | 10/1997 |
| DE | 19729076 | 1/1999 |

\* cited by examiner

*Primary Examiner*—Paul N. Dickson
*Assistant Examiner*—Joselynn Y Sliteris
(74) *Attorney, Agent, or Firm*—Tarolli, Sundheim, Covell, Tummino & Szabo L.L.P.

(57) ABSTRACT

For opening a closure disc arranged on a pressurized container for activating a vehicle occupant restraint system, the surface area of the closure disc is locally exposed to an arc discharge between an electrode and the closure disc. By means of an electrical insulation a linear zone of interaction is delimited between the electrode and the surface area of the closure disc. The arc discharge is initiated in a punctiform manner and then continued over the length of the linear zone of interaction, the closure disc thereby being perforated along the linear zone of interaction by the arc discharge. Due to the effect of the internal pressure of the pressurized container and starting from the two ends of the weakened zone of interaction, a strip of material is then peeled and bulged open from the closure disc in a direction transverse to the linear zone of interaction.

28 Claims, 2 Drawing Sheets

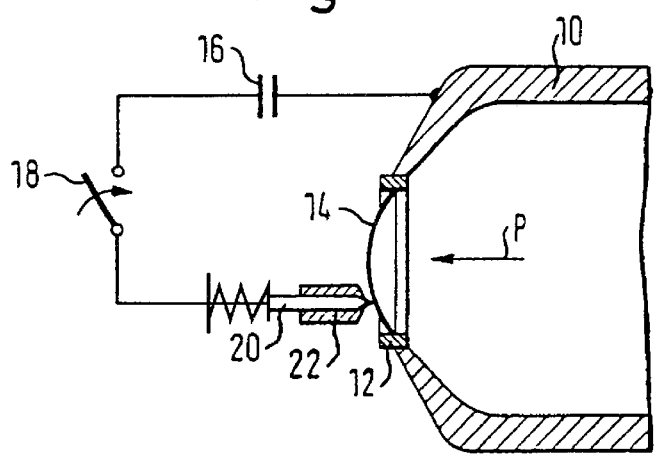
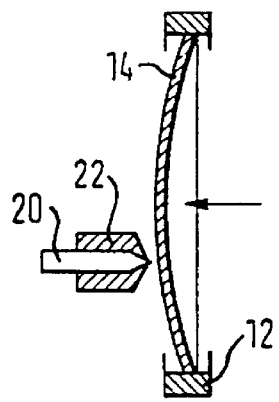 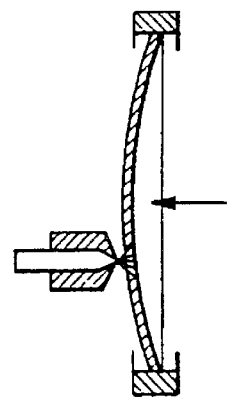 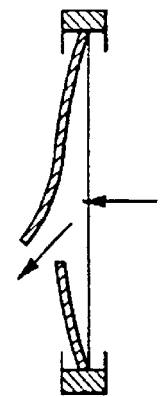 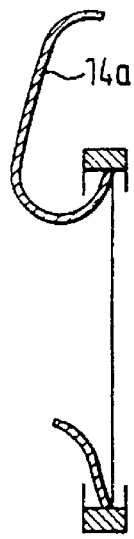
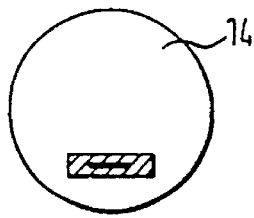 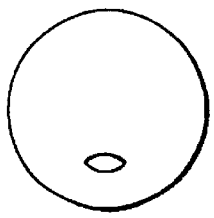 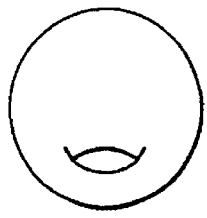 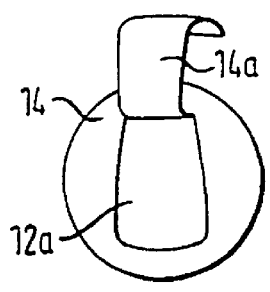

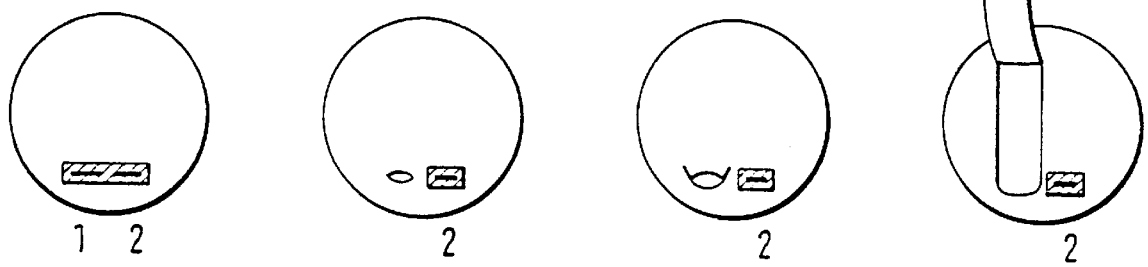
Fig. 4
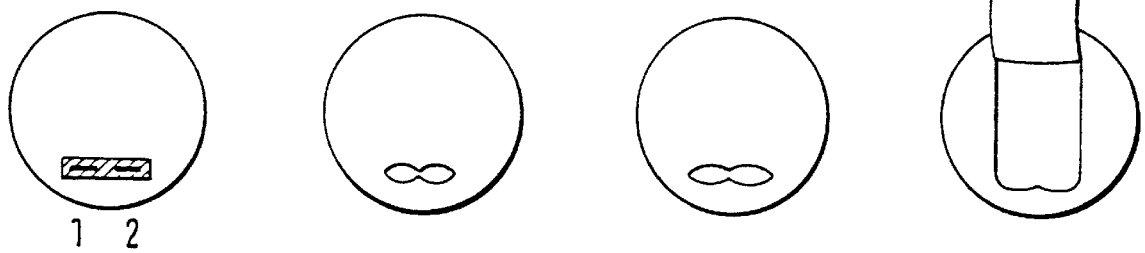
Fig. 5
Fig. 6
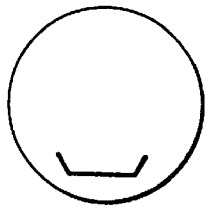

METHOD OF OPENING A BURST DISC ON A PRESSURIZED CONTAINER AS WELL AS A COMPRESSED GAS SOURCE FOR ACTIVATING A VEHICLE OCCUPANT RESTRAINT SYSTEM

The invention relates to a method of opening a closure disc arranged on a pressurized container as well as to a compressed gas source for activating a vehicle occupant restraint system.

Already known from DE 195 24 094 A1 is a burst disc on a pressurized container for a vehicle occupant restraint system which may be perforated by an electric arc or weakened at least to the extent that it bursts when exposed to the internal pressure of the compressed gas container. The arc discharge may be struck between the surface of the burst disc and an electrode arranged spaced away from this surface and fed by a high-voltage source. In actual practice, however, it has been found out that a reproducible opening response cannot be attained by this method, the burst diaphragm either being perforated only locally or bursting in an uncontrolled manner. For satisfactory functioning of a restraint system, especially an inflatable protective cushion, it is mandatory, however, that a gas exit port is exposed on the compressed gas container with a reproducible flow cross-section. Since this requirement fails to be satisfied by the known method it has not achieved any significance in actual practice.

By means of the invention a method of opening a closure disc arranged on a pressurized container is provided with which a gas exit port having a reproducibly determined flow cross-section may be exposed in the closure disc of the pressurized container by applying an arc discharge. In accordance with the invention a linear zone of interaction is delimited between an electrode and the surface area of the closure disc by means of an electrical insulation, the arc discharge being initiated in a punctiform manner and then continued over the length of the linear zone of interaction. The closure disc is weakened along the linear zone of interaction between the two ends thereof by the arc discharge, at least to such an extent that under the effect of the internal pressure of the pressurized container and starting from both ends of the weakened zone of interaction, a strip of material is peeled and bulged open from the closure disc in a direction transverse to the linear zone of interaction. The width of the material strip—and thus that of the gas exit port formed in the closure disc—is defined by the extent of the linear zone of interaction. It has been found out that between the linear end face of the electrode and that of the surface of the closure disc opposite thereto, the arc discharge initially occurs in a punctiform manner before the electric arc tends to spread along the predefined zone of interaction due to the high current density. The electric arc perforates the closure disc initially in a punctiform manner and is then propagated laterally under the effect of escaping gas so that the electric arc continues to progress on both sides of the punctiform perforation, thus perforating the closure disc along the full zone of interaction or weakening it at least to a sufficient degree so that under the effect of the internal pressure of the pressurized container peeling occurs, commencing along the linear zone of interaction. At the ends of the zone of interaction shear stress within the material of the closure disc results in a shear effect as a result of which a strip of material is peeled from the closure disc between the ends of the zone of interaction. The length of the strip of material thus peeled is substantially defined by the rim of the closure disc. Accordingly, a gas exit port is exposed in the closure disc, the width of which is defined by the width of the linear zone of interaction and the length of which is determined on the one hand by the localization of the zone of interaction and, on the other, by the rim of the closure disc, the gas exit port thus formed, therefore, being reproducible in shape and size.

As compared to conventional methods, the method in accordance with the invention offers the advantages of being highly practical and safe. unlike pyrotechnic-based methods it has the advantage that no toxic substances and combustion products are formed whilst eliminating the need to handle and stock explosive materials. As compared to all known methods it has the advantage of an extremely fast opening response, practical tests having demonstrated that a period of only slightly more than 100 ms is sufficient for the opening response. Conventional methods are slower by a factor 10 and more. Fast activation is a salient criterion especially in the case of restraint systems for protection against side impact.

It has furthermore been found out that a surprisingly low amount of electrical energy is sufficient for successfully implementing the method.

Tests have indicated it to be particularly favorable to provide a discharge path very small in length, this being achieved by the end face of the electrode being directly contacting the surface area of the closure disc so that the arc discharge occurs at an extremely high amperage which may amount to a few thousand amperes, whilst operation is permitted with a low discharge voltage in the range of but 100 volts or less. It has been found out that increasing the voltage achieves no significant improvement in the opening response. Employing a low discharge energy has in addition the advantage that it may be stored in a capacitor of acceptable size, good results having been attained with a capacitor having a capacitance of approx. 4 to 8 mF. Depending on the strength of the voltage employed the capacitance of the capacitor may be in the range 1 to 10 mF, corresponding to a voltage range of approx. 50 to approx. 200 volts.

It is also the object of the invention to provide a compressed gas source for activating a vehicle occupant restraint system in which the disc closing off the pressurized container is opened by the method in accordance with the invention to activate the restraint system. The salient feature of the compressed gas source in accordance with the invention is an electrical insulation defining a linear zone of interaction between the electrode and the surface area of the closure disc.

Further advantages and features of the invention appear from the following description with reference to the attached drawings in which FIG. 1 is a sketch illustrating the method in accordance with the invention;

FIGS. 2a to 2d illustrates four steps of an opening response implemented in accordance with the method at the disc closing off a pressurized container;

FIGS. 3a to 3d illustrates the same opening response as viewed from above:

FIGS. 4 and 5 illustrates two variants of the method in four different steps, each shown as viewed from above the closure disc of a pressurized container; and FIG. 6 illustrates another variant of the method.

Referring now to FIG. 1 there is illustrated as schematically sectioned a pressurized container of a vehicle occupant restraint system, more particularly of a restraint system having an inflatable protective cushion, the pressurized container being filled with an inert gas at high pressure, The pressurized container 10 has one end in the shape of a blunt wedge with a circular port 12 closed off by a closure disc 14. This closure disc 14 is bulged convexly outwards due to the effect of the high internal pressure.

The body of the pressurized container 10 is electrically connected to one terminal of a capacitor 16, the other terminal of the capacitor 16 being connectable via a switch 18 to an electrode 20, the exposed end face of which directly contacts the surface of the closure disc 14. The electrode 20 is surrounded at its end face end by an electrical insulation 22 of a heatproof material. The electrode 20 is configured at its free end as a blunt wedge having a generally linear, plane end face a few tenths of a millimeter wide and 10 to 20 mm long. As best evident from FIG. 3a the electrode 20 is located excentrically, near the rim of the closure disc 14. The insulation 22 forming likewise a blunt wedge at its free end leaves only the end face of the electrode 20 exposed opposite the closure disc 14. In this way the electrical insulation 22 defines a linear zone of interaction between the electrode 20 and the surface of the closure disc 14.

The capacitor 16 is charged to a voltage in a range of 50 to 200 volts, preferably 70 to 100 volts, the capacitance of the capacitor 16 is of the order of 1 to 10 mF, preferably 4 to 8 mF for a voltage range of 70 to 100 volts.

To activate the vehicle occupant restraint system the switch 18 is closed. This switch 18 may be configured as a semiconductor switch triggered by an activating pulse. The electrode 20 may have a generally linear end face lying opposite the surface area of the closure disc 14. The end face may have a center or middle portion which is more proximate to the closure disc 14 than other portions of the end face. Since the electrode 20 directly contacts by its planar end face the bulging surface of the closure disc 14, a point of contact with the metallic closure disc materializes roughly in the center of this end face. Due to the sufficiently high voltage to which the capacitor 16 is charged it is assured that irrespective of any contact resistance between the electrode 20 and the closure disc 14 an arc discharge having an extremely high amperage is generated, the amperage of the arc discharge attaining values of a few thousand amperes after but a few microseconds. Due to the electric arc being struck initially in a punctiform manner the closure disc 14 is perforated locally. Because of the high current density in the electric arc, supported by the gas now escaping through the perforation from the pressurized container 10, the electric arc is displaced in both directions laterally along the end face of the electrode 20. Due to this effect the arc discharge is extended over the full length of the end face of the electrode 20 and consequently over the full length of the zone of interaction defined by the electrical insulation 22. The electrical insulation 22 prevents the arc discharge from wandering up the stem of the electrode 20. Defining the zone of interaction by means of the electrical insulation 22 thus results in a particularly high current density in the arc discharge, due to which the closure disc 14 is perforated along this zone of interaction and weakened at least to the extent that it is peeled off by the effect of the internal pressure P of the pressurized container 10. FIG. 2b illustrates the initial effect of the electric arc; in FIG. 2c commencement of peeling is depicted. The closure disc 14 has burst along the linear zone of interaction; as evident from FIG. 3c the closure disc has burst at the ends of the linear zone of interaction transversely to the extent so that a strip of material is peeled off in a width corresponding to the length of the linear zone of interaction. This peeling effect materializes from the mechanical stress conditions at the ends of the zone of interaction, these stress conditions resulting in shear forces which in combination with the weakening of the material due to the arc discharge burst the closure disc 14 transversely to the extending direction of the zone of interaction. As evident from FIGS. 2d and 3d peeling is continued due to the effect of the internal pressure P of the pressurized container 10 so that a strip of material is peeled from the closure disc 14, the length of which is substantially defined by the rim of this closure disc. This strip of material, identified 14a in FIG. 3d, remains connected to the closure disc 14 and bulges upwards as well as returning behind the rim of the closure disc 14 to thus expose a gas exit port 12a. As evident from FIGS. 3a to 3d the shape and size of the gas exit port 12a is defined by the location of the zone of interaction on the closure disc and by its width.

In the variant of the method as evident from FIG. 4 two juxtaposed separate zones of interaction are arranged in line near to the rim of the closure disc 14. These zones of interaction are identified "1" and "2", each of them having its own electrode with a separate ignition circuit as evident from FIG. 1. The corresponding arc discharges may be activated separately, independently or also in common. In the aspect as shown in FIG. 4 an arc discharge is activated only at the zone of interaction identified "1", a relatively narrow strip of material being thus peeled from the closure disc 14. In the variant as shown in FIG. 5 an arc discharge is activated at each of the two zones of interaction "1" and "2", this activation preferably occurring simultaneously, resulting in a wider strip of material being peeled. In the variant of the method as described, controlling the exit flow characteristic is made possible via the size of the exposed gas exit port, such control permitting to optimize the functioning of the occupant restraint system.

Referring now to the variants as shown in FIG. 6, the ends of the zone of interaction defined by the electrical insulation are angled in the direction of the intended peeling action, thus enabling an improved reproduction of the shape and size of the gas exit port exposed by the peeling action.

As already mentioned, providing a minimum spacing between the electrode and the surface of the closure disc is of advantage since a high current density is achievable for a low discharge voltage whilst, on the other hand, the shape and size of the closure disc may be varied as a function of tolerance and temperature, this being the reason why it is provided for in this preferred embodiment to maintain the electrode axially movable by its end face in contact with the surface area of the closure disc using a spring force.

The method as described achieves reliable opening of the disc closing off the pressurized container without the use of any pyrotechnic means whatsoever. However, this also eliminates the warm-up of the emerging gas made use of in pyrotechnic methods of opening to compensate for the cooling effect involved in the drop in pressure. This is why in a further aspect of the method it is provided for to exploit the electric arc to simultaneously ignite a reactive material. A reactive material may be contained in the charge of the pressurized container, for example in the form of a reactive gas, such as hydrogen, added to the inert gas charge or in the form of a solid coating on the inner wall of the pressurized container.

As compared to pyrotechnic methods of opening one major advantage afforded by the method as described is that the functional readiness of the system may be regularly and systematically monitored. The functional readiness of the system is assured when the capacitor 16 has the necessary charging voltage and the circuit is closed, both of which may be checked and monitored with conventional test circuits. A check may be done periodically or permanently, for example, every time the vehicle is started, immediately after the ignition switch is closed.

The electrical insulation needed to define the linear zone of interaction—in a departure from the embodiments as described—may be arranged on the surface area of the closure disc 14, a further variant providing an electrical insulation on both the surface area of the closure disc and on the electrode.

What is claimed is:

1. A method of opening a closure disc arranged on a pressurized container, in particular for activating a vehicle occupant restraint system, by locally affecting a surface area of said closure disc with an arc discharge between an electrode and said closure disc, wherein a linear zone of interaction is delimited between said electrode and said surface area of said closure disc by means of an electrical insulation, said arc discharge being initiated at a single point and then continued over a length of said linear zone of interaction, said closure disc being weakened between two ends along said linear zone of interaction by said arc discharge at least to such an extent that under an effect of internal pressure of said pressurized container and starting from both ends of said linear zone of interaction, a strip of material is peeled and bulged open from said closure disc in a direction transverse to said linear zone of interaction.

2. The method as set forth in claim 1, wherein said electrode has a particular shape and said linear zone of interaction is defined by said shape of said electrode.

3. The method as set forth in claim 1, wherein said electrode has a generally linear end face opposite said surface area of said closure disc, said end face being more proximate to said closure disc in a middle portion thereof than at other portions thereof.

4. The method as set forth in claim 3, wherein said end face of said electrode in said middle portion thereof contacts said surface area of said closure disc.

5. The method as set forth in claim 3, wherein said end face of said electrode is essentially plane and said closure disc is convex by bulging in a direction towards said electrode.

6. The method as set forth in claim 4, wherein said end face of said electrode is maintained in contact with said closure disc by spring force.

7. The method as set forth in claim 1, wherein said electrode is surrounded by said electrical insulation and substantially only an end face of said electrode is left exposed.

8. The method as set forth in claim 1, wherein said electrical insulation is formed from a material of high thermal endurance.

9. The method as set forth in claim 1, wherein said closure disc is circular and has a center and said electrode is eccentrically arranged on said surface area of said closure disc and said peeling of said strip of material proceeds towards said center and beyond said center of said closure disc.

10. The method as set forth in claim 1, wherein said peeled strip of material remains connected to said closure disc.

11. The method as set forth in claim 1, wherein at least two arc discharges activatable separate from each other are provided at two linear zones of interaction of said closure disc, for selectively opening the closure disc at two different locations.

12. The method as set forth in claim 1, wherein said arc discharge is fed by a capacitor.

13. The method as set forth in claim 12, wherein said capacitor is charged to a voltage between approximately 50 V and approximately 200 V.

14. The method as set forth in claim 13, wherein said capacitor has a capacitance in the range of 1 to 10 mF.

15. The method as set forth in claim 1, wherein said arc discharge is used to ignite a reactive material.

16. The method as set forth in claim 15, wherein said reactive material is contained in a filling of said pressurized container.

17. The method as set forth in claim 12, wherein functional readiness of said capacitor is tested on starting a vehicle wherein said pressurized container is mounted.

18. A compressed gas source for activating a vehicle occupant restraint system, including a pressurized container which has a gas exit port closed off by a closure disc, and an electrode having a particular shape and being arranged opposite a surface area of said closure disc, said electrode being connectable to an electrical source of energy for generating an arc discharge between said electrode and said closure disc, wherein a linear zone of interaction is delimited between said electrode and said surface area of said closure disc by means of an electrical insulation which is defined by said shape of said electrode.

19. The compressed gas source as set forth in claim 18, wherein said electrode has a shape of a blunt wedge.

20. The compressed gas source as set forth in claim 19, wherein said electrode has a generally linear end face lying opposite the surface area of said closure disc, said end face having a center portion which is more proximate to said closure disc than other portions of said end face.

21. The compressed gas source as set forth in claim 20, wherein said center portion of said end face contacts said surface area of said closure disc.

22. The compressed gas source as set forth in claim 20, wherein said face of said electrode is essentially planar and said closure disc has a convex bulging directed towards said end face.

23. The compressed gas source as set forth in claim 22, wherein said end face of said electrode is maintained in contact with said closure disc by spring force.

24. The compressed gas source as set forth in claim 18, wherein said electrode engages and covers said electrical insulation and has a free end, only said free end being left exposed.

25. The compressed gas source as set forth in claim 18, wherein said electrical insulation is formed from a material of high thermal endurance.

26. A compressed gas source for activating a vehicle occupant restraint system, including a pressurized container which has a gas exit port closed off by a closure disc, and an electrode having a particular shape and being arranged opposite a surface area of said closure disc, said electrode being connectable to an electrical source of energy for generating an arc discharge between said electrode and said closure disc, wherein a linear zone of interaction is delimited between said electrode and said surface area of said closure disc by means of an electrical insulation which is defined by said shape of said electrode, said electrode being arranged eccentrically on said surface area of said closure disc.

27. A compressed gas source for activating a vehicle occupant restraint system, including a pressurized container which has a gas exit port closed off by a closure disc, and an electrode having a particular shape and being arranged opposite a surface area of said closure disc, said electrode being connectable to an electrical source of energy for generating an arc discharge between said electrode and said closure disc, wherein a linear zone of interaction is delimited between said electrode and said surface area of said closure disc by means of an electrical insulation which is defined by said shape of said electrode, said linear zone of interaction having end sections that are angled in a desired direction of peeling.

28. A compressed gas source for activating a vehicle occupant restraint system, comprising: a pressurized container which has a gas exit port closed off by a closure disc, and an electrode arranged opposite a surface area of said closure disc, said electrode being connectable to an electrical source of energy for generating an arc discharge between said electrode and said closure disc, and electrical insulation engaging said electrode and defining a linear zone of interaction at a region between said electrode and said surface area of said closure disc.

\* \* \* \* \*